Nov. 5, 1963  A. U. BRYANT  3,109,623
VALVE CONSTRUCTION HAVING RESILIENT SEALING MEANS
Filed Oct. 31, 1961  4 Sheets-Sheet 2
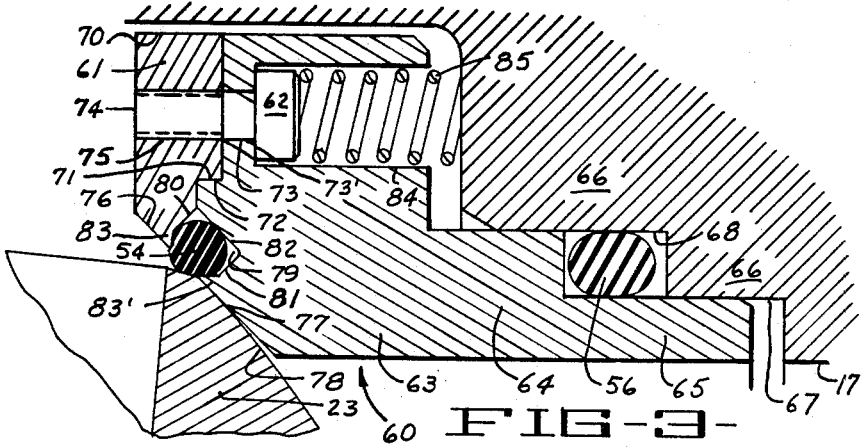
FIG-3-
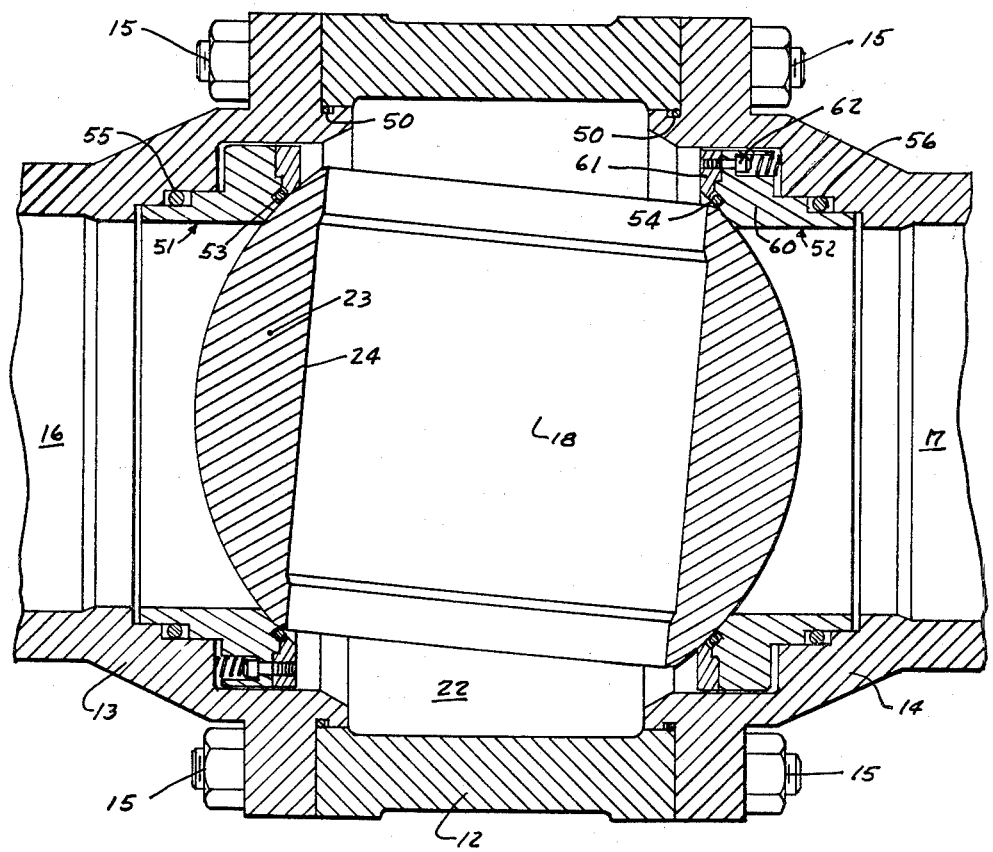
FIG-2-
INVENTOR.
AUSTIN U. BRYANT
BY
Edward B. Beay

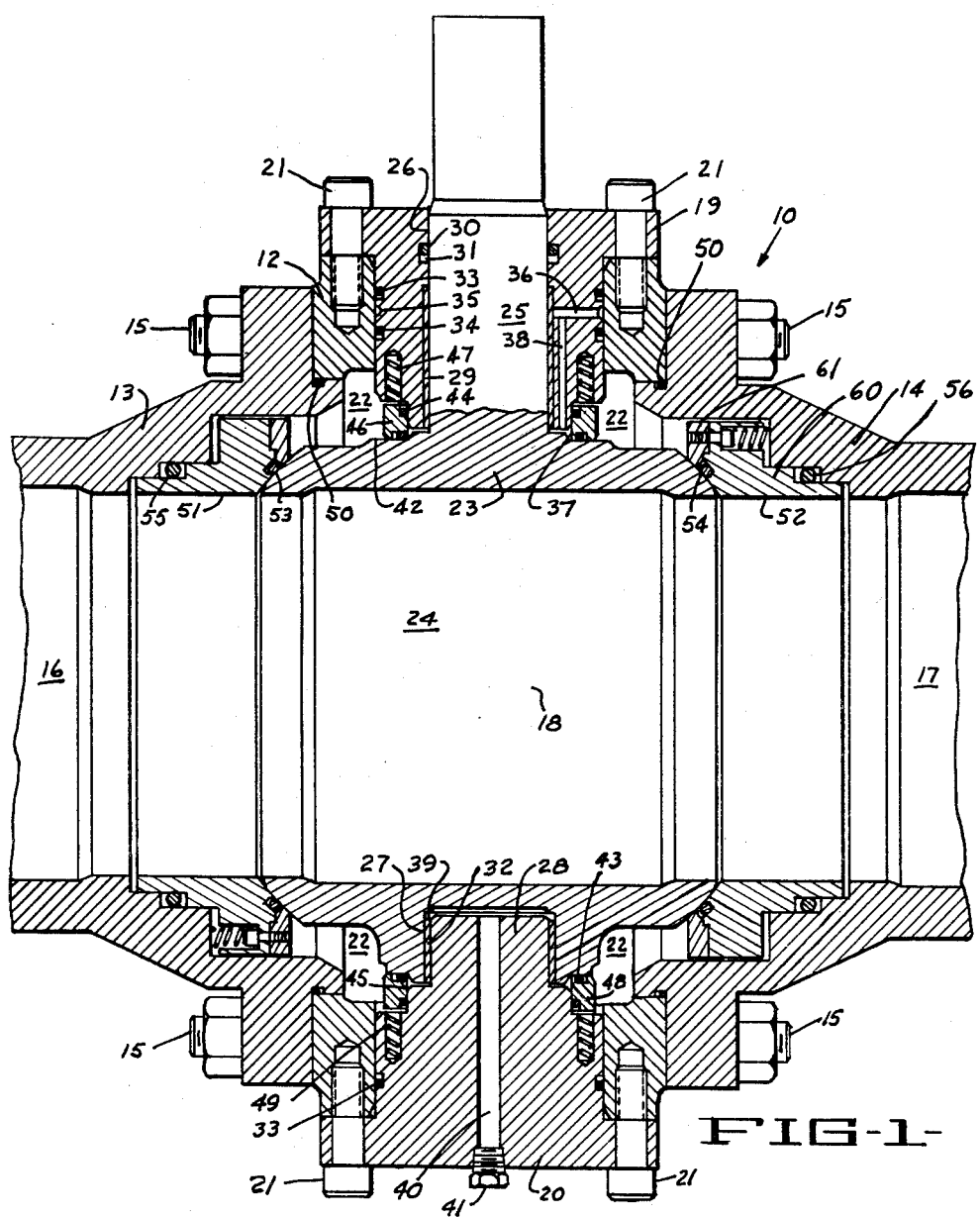
FIG-1-

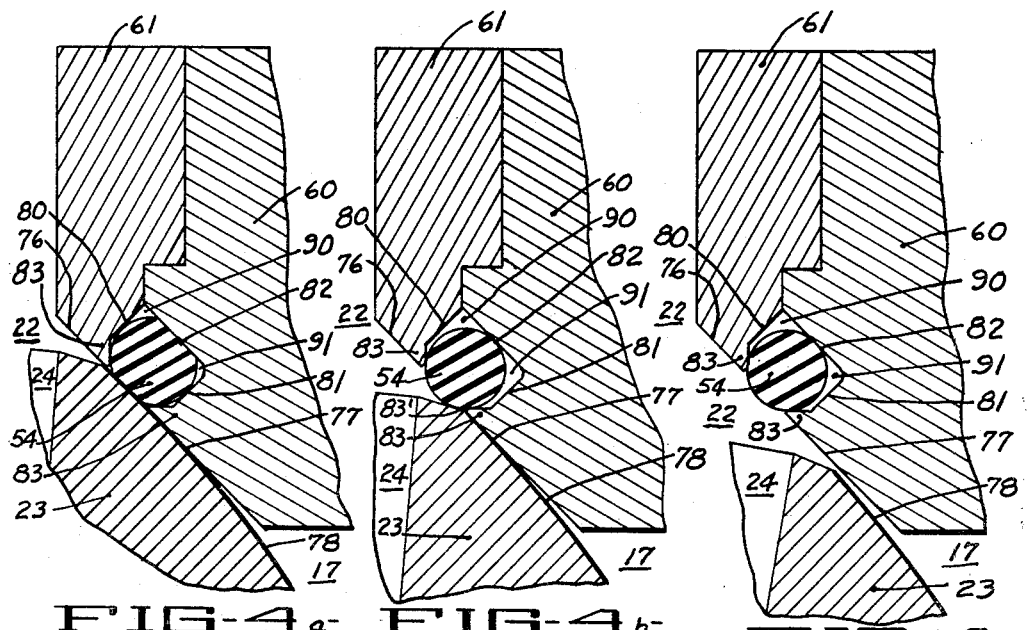
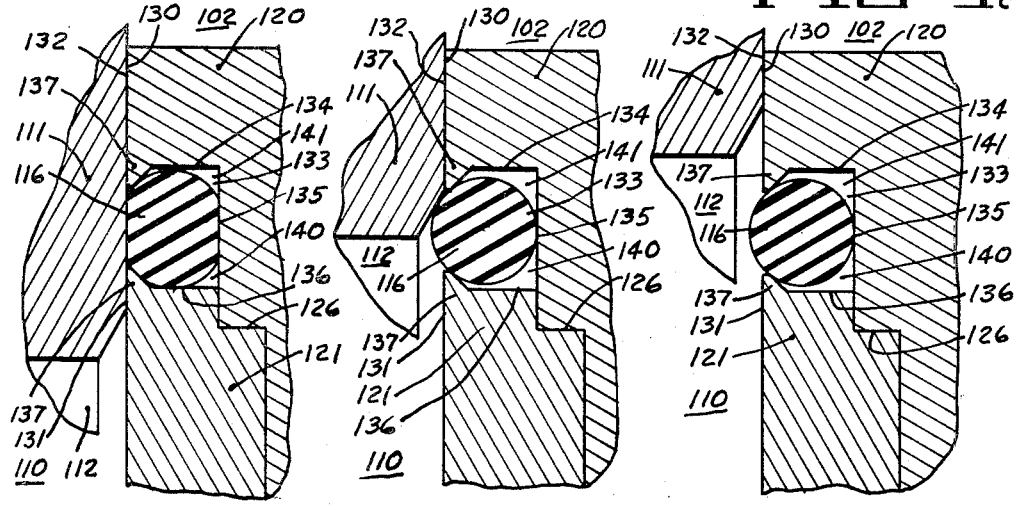

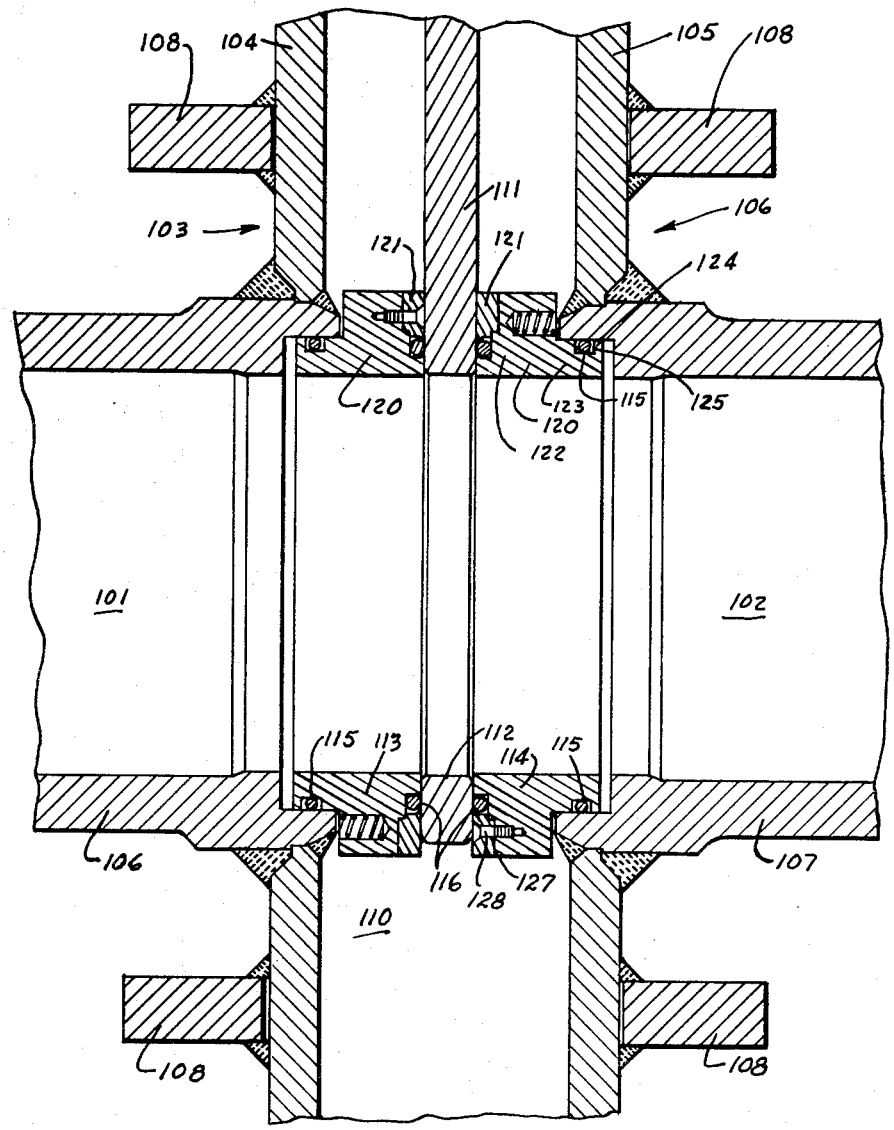
FIG-5-

United States Patent Office 3,109,623
Patented Nov. 5, 1963

3,109,623
VALVE CONSTRUCTION HAVING RESILIENT
SEALING MEANS
Austin U. Bryant, Walnut Creek, Calif., assignor to Grove
Valve and Regulator Company, Oakland, Calif., a corporation of California
Filed Oct. 31, 1961, Ser. No. 149,066
10 Claims. (Cl. 251—172)

This invention relates generally to valve construction for controlling the flow of various fluids, including gases and liquids, and more particularly to the construction of the means which accommodates and holds the resilient seal means of the O-ring type which seals the flow passage.

In the past, resilient seal rings of the O-ring type have been extensively utilized to provide a fluid tight seal between the flow passages. For example, in valves of the slide type, either the valve body or the valve element was provided with a recess for housing a resilient seal ring which, in the closed valve position, was firmly urged into sealing contact against a corresponding valve working surface by radial compression. The problem encountered with such valve, when employed in connection with the control of high pressures, is the tendency of displacement or "blowing-out" of the resilient seal ring when the valve element was moved between its open and closed positions.

To obviate this tendency of dislodging the resilient seal ring, the bottom of the recess accommodating the seal ring was vented to the flow passage on the downstream side to provide a pressure differential that urged the seal ring firmly against the recess bottom when the seal ring was exposed to upstream pressure during valve operation, as fully described in U.S. Patent No. 2,713,989 granted July 26, 1955, to Austin U. Bryant and entitled "Valve Construction." Venting of the accommodating recess to the downstream side proved very successful in overcoming the danger of "blowing-out" the seal ring as it was exposed to pressure from the upstream side while the valve was being opened. Of course, the type of valve there described accomplished sealing between the upstream and the downstream side by means of a single resilient seal ring since only a vent to the downstream passage would provide the desired pressure differential.

The principle of venting seal ring accommodating recesses to the downstream side was carried over into valves of the gate, plug, ball and butterfly type in which a valve element of the movable type is interposed between the downstream and the upstream side and a seal ring accommodating recess is carried by the valve body. As long as these valves are utilized for controlling unidirectional fluid flow and seal on the downstream side only, the principle of venting the seal ring accommodating recess to the downstream side has proven very satisfactory to prevent dislodgement of the resilient seal ring.

It is often desirable to provide valves which provide two-way service, that is, valves which may be opened and closed with fluid pressure being applied to either side. Such a valve is disclosed in U.S. Patent No. 2,950,-897 issued Aug. 30, 1960, to Austin U. Bryant for "Valve Construction." In this valve, resilient seal ring accommodating recesses mounted in the valve body and surrounding both flow passages are provided which cooperate with oppositely disposed valve surfaces on the valve element. Each recess is vented to the flow passage it surrounds and to the body space. Further, the valve is so constructed to seal only on the downstream side so that the recess holding the seal ring which seals the valve is vented to the downstream side. The upstream recess which is vented to the upstream side does not provide positive sealing so that no substantial differential pressures act thereon intending to dislodge the same.

In certain other valves of the two-way (reversible) type it has been found desirable to provide positive sealing of both the upstream and the downstream side so that the body space is sealed from the upstream and the downstream passage when the valve is in its closed position. Such a valve is disclosed in U.S. Patent No. 2,810,-543 issued Oct. 22, 1957, to Austin U. Bryant for "Valve Construction." In this valve the recesses encompassing the upstream and the downstream passages have one corner vented to their respective flow passages and the other corner vented to the body space. This recess construction favors the downstream side of valve in that it prevents dislodgement of the downstream O-ring. The upstream O-ring is held in place against dislodgement by utilizing retaining lips and a very hard O-ring and the vent to the body space.

In the above constructions, the downstream recess was vented to the downstream side to prevent trapped pressure from blowing out the seal ring. As a result of such a construction, the upstream recess was in communication with upstream pressure, necessitating the use of retaining lips and hard O-rings.

None of the presently available valves, of the type utilizing an O-ring resilient seal ring in a recess carried by the valve body and having a movable valve element sealing against the seal ring, include a construction which favors the upstream seal ring and which is particularly suited for providing primarily an upstream seal.

It is therefore an object of this invention to provide a valve which is particularly suitable to seal on the upstream side.

It is another object of this invention to provide a valve which seals on the upstream and the downstream side and in which the upstream recess accommodating the upstream resilient seal ring is constructed to prevent dislodgement of the upstream seal ring.

It is still another object of this invention to provide a valve for block and bleed service, i.e., a valve which permits bleeding of the body space whilst retaining positive upstream and downstream sealing.

It is a further object of this invention to provide a valve capable of controlling flow in either direction in which the recess accommodating the upstream seal ring is constructed to aid retention of this seal ring.

A further problem encountered with prior art valves having the inner corner of their accommodating recesses vented to respective flow passages is bulkiness of the inner mounting ring of the seal ring mounting means which must be sufficiently strong to withstand the forces acting thereon in its partially open, as well as fully open and fully closed position. Since the inner mounting ring forms the inner peripheral surface of the accommodating recess (so its loose retention to the outer mounting ring provides the vent) its radial thickness must be above a certain minimum value. This radial distance, added to the radius of the flow passage therefore provides the minimum allowable radius of the seal ring and thereby the size of the valve element such as for example the ball diameter of a ball valve.

It is another object of this invention to provide a valve of the two-way type adapted for sealing on the upstream or the downstream sides in which the valve element for given diameter flow passage is smaller than has been possible heretofore.

In accordance with one embodiment of this invention, a valve of the ball type is provided having a floating seal ring mounting means, movable in opposite directions, in each of its flow passages. The mounting means comprises a two-part construction, the inner mounting ring, that is the one with the smaller diameter having an inner bore substantially equal to that of the flow passages, forming the main part of the mounting means, whilst the outer mounting ring provides the outer peripheral surface of the accommodating recess. The recess is vented between the inner and outer mounting ring so that the outermost corner of the recess is vented to the valve body space which also accommodates the movable valve element such as a ball. The recess corner closest to the flow passage remains isolated pressure wise from its associated flow passage.

Other objects and a fuller understanding of the invention may be had by referring to the following description, taken in connection with the accompanying drawings, in which:

FIG. 1 shows a side elevational view in section illustrating a ball valve incorporating the present invention;

FIG. 2 is a top view in section showing the ball valve in the closed position, the valve element being shown slightly turned to a position just prior to opening or just after closing;

FIG. 3 is an enlarged cross section detailed diagrammatically showing the positioning of the valve operating parts in moving between closed and open position corresponding to the upper right-hand section of FIG. 2;

FIGS. 4a, 4b and 4c are enlarged cross-sectional details diagrammatically showing the various positions of the edge of the valve element relative to the resilient seal rings when moving between open and closed position of the valve of FIG. 1;

FIG. 5 is a side-elevational view in section illustrating a valve of the gate type incorporating the present invention;

FIGS. 6a, 6b and 6c are enlarged cross sectional details diagrammatically showing the positioning of the gate of FIG. 5 in moving between closed and open position.

Referring now to the drawings and particularly to FIGS. 1 and 2 thereof, there is shown a valve of the ball-type generally designated as 10. Ball valve 10 comprises a valve body 12 having affixed thereto, on opposite sides, sides, a pair of fluid passage housings 13 and 14 by means of bolts 15. Each of housings 13 and 14 is provided with a central bore 16 and 17 respectively which define the inflow and outflow passages of valve 10. Passages 16 and 17 are coaxial and their axes define a flow axis 18.

Valve 10 is also provided with an upper bonnet 19 and a lower bonnet 20 clamped to opposite extremities of body 12 by means of conventional bolts 21. Valve body 12 also includes an inner space 22 located between passages 16 and 17 which houses a valve element 23 of substantially spherical shape having an inner cylindrical bore 24 coaxial with flow axis 18. Valve element 23 is rotatably journaled by upper and lower bonnets 19 and 20 preferably but not necessarily in the manner described in my copending application, Serial No. 104,644 entitled "Fluid Valve" filed on April 21, 1961.

Briefly, valve element 23 includes an operating stem 25 received by a bore 26 in upper bonnet 19 and a short bearing lined cylindrical bore 27 coaxial with stem 25 received by a cylindrical boss 28 depending upwardly from lower bonnet 20. The lower portion of bore 26 is undercut to accommodate a bearing 29 and also includes means for providing a fluid tight seal between stem 25 and bore 26, such as resilient O-ring seal 30 in recess 31. Boss 28 is lined with a bearing 32. Bearings 29 and 32 may comprise a Teflon impregnated sintered metal sleeve or an anti-friction bearing.

Upper and lower bonnets 19 and 20 are fluid tightly sealed to valve body 12 by means of conventional resilient O-ring type seals in suitable accommodating recesses generally designated by reference character 33. Upper bonnet includes a further fluid tight seal 34 below seal 33. Between seals 33 and 34 on upper bonnet 19 there is provided an annular undercut 35 vented to a passage separated from the atmosphere by a vent plug (not shown) which passage is in communication with the space occupied by bearing 29 through a passage 36 and a space 37 below bearing 29 through a passage 38. Similarly the space 39 housing bearing 32 is vented through passage 40 which is capped by a vented plug 41.

Valve element 23 is provided with two annular planar surfaces 42 and 43 concentric with the axis of rotation of element 23. Upper and lower bonnets 19 and 20 are respectively provided with cylindrical surfaces 44 and 45 which are at right angles to surfaces 42 and 43. An upper bonnet mounting means 46 surrounds surface 44 and has an end face opposite to surface 42. A pair of O-ring type seals mounted in suitable recesses in mounting means 46 provide a fluid tight seal between body space 22 and space 37. Mounting means 46 is urged into sealing contact with surface 37 by springs 47 housed in suitable recesses in upper bonnet 19 and by fluid pressure in body space 22 as fully explained in the above referred to copending application.

Similarly, a mounting means 48 surrounding surface 45 and having its end face opposite surface 43 is provided with suitable recesses for accommodating a pair of resilient O-ring type seals to provide a fluid tight seal between body space 22 and space 39 which houses bearing 32. Again, mounting means 48 is urged into sealing contact with surface 43 by a spring 49 housed in lower bonnet 20 and the differential fluid pressure between body space 22 and bearing space 39. Also flow passage housings 13 and 14 are fluid tightly sealed to valve body 12 by resilient O-ring type seals 50 in suitable recesses.

Flow passages 16 and 17 are sealed with respect to one another by valve element 23 which is rotatable between an open and closed position. Sealing between flow passages 16, 17 and valve element 23 when the latter is in its closed position is provided respectively by floating mounting means 51 and 52, carrying resilient O-ring type seal rings 53 and 54 for contact with working surface on valve element 23 and resilient O-ring type seal rings 55 and 56 for contact with complementary surfaces in fluid passage housings 13 and 14 to seal around the mounting means.

Floating mounting means 52 comprises a larger inner mounting ring 60 and a smaller outer mounting ring 61 as best shown in FIG. 3. Both mounting rings are metallic, and outer mounting ring 61 is mounted upon inner mounting ring 60 by means of a plurality of fastening devices such as circumferentially spaced screws 62 in such a manner that fluid may pass between respective mating faces.

Inner mounting ring 60 is cylindrical and comprises a main portion 63 having an intermediate portion 64 of reduced exterior diameter and a tail portion 65 of a further reduced exterior diameter. The adjacent interior portion of flow passage housing 14 is provided with a cylindrical bore 67 in which tail portion 65 is slidingly fitted. Adjacent portion 66 is also provided with a cylindrical bore 68 to slidingly receive intermediate portion 64. Adjacent portion 66 is further provided with a cylindrical bore 69 to slidingly receive main portion 63, bore 69 primarily providing clearance so that a sliding fit between main portion 63 and bore 69 is not essential.

Outer mounting ring 61 is likewise ring shaped having an outer peripheral face 70 of substantially the same exterior diameter as main portion 63 and is formed with a retaining shoulder 71 which is dimensioned to snugly fit over a corresponding retaining boss 72 depending axially from main portion 63. Outer mounting ring 61 includes a number of threaded openings 75 uniformly distributed upon a pitch circle 74 for receiving the threaded ends of fastening screws 62. Inner mounting ring 60 is provided with bores 84 corresponding to tapped openings 75 ending in an opening 73 defining a shoulder 73'. The heads of screws 62 seat on shoulder 73'.

Face 76 of outer mounting ring 61 and face 77 of inner mounting ring 60 are machined to form a valve surface which is annular and has the configuration of a conical sector of a cone whose surface is substantially tangent to the surface of the valve element at the point of sealing contact. The outer surface 78 of valve element 23, when element 23 is in its closed position, forms the opposing valve working surface. A groove or recess 79 for O-ring 54 is formed between surface 80 of outer mounting ring 61 and surfaces 81 and 82 of inner mounting ring 60. Surfaces 80 and 81 are opposite to one another to provide respectively the outer and inner peripheral sides and surface 82, the bottom of the groove accommodating seal ring 54. Surface 81 and 82 have a curved outer portion, as illustrated, thereby forming retaining lips 83 for O-ring 54. For metal to metal sealing the outer lip surface 83' of the inner mounting ring contacts valve element 23.

Openings or bores 84 also accommodate compression springs 85. Normally springs 85 urge mounting means 52 into sealing contact with valve surface 78 as will presently be explained. Mounting means 51 is constructed to be identical to mounting means 52 and is placed to encompass flow passage 16 in a position facing mounting means 51.

Referring now briefly to FIG. 2, it is immediately apparent that O-ring 56 provides a fluid tight seal between mounting means 52 and housing 14. Furthermore, in the embodiment selected for illustrating the operation of this invention, when valve element 23 is in its closed position, O-ring 54 provides a fluid tight seal between mounting means 52 and valve element 23. In other words, inner body space 22 is sealed with respect to flow passage 17. In the same way, flow passage 16 is sealed from inner body space 22 when valve element 23 is in its closed position.

The diameter of O-ring 56 for this embodiment is selected in such a manner that its outer diameter is larger and its inner diameter is smaller than the diameter of the point of contact of O-ring 54 with valve surface 77 so that fluid pressure differential urges the upstream and downstream mounting means against valve element 23 as fully explained in U.S. Patent No. 2,796,230 issued June 18, 1957, to Grove et al. for "Valve Construction." In other words, in the embodiment shown, both the upstream and the downstream passages are sealed.

As has already been stated, the mounting means construction of this invention may be advantageously incorporated with valves which seal either on the upstream and downstream side or on the upstream side only. For valves which seal on the upstream side only, the mounting means are modified in such a manner that the inner diameter of seal ring 56 is larger than the mean or contact diameter of seal ring 54 or use the construction shown and described in connection with FIG. 5. The reason for stating that the diameter of the above mentioned bores and portions are increased is that the diameter of seal ring 54 should remain as small as possible so that the size of valve element 23 and thereby the size of valve 10 may be kept at a minimum.

Operation of valve 10 which provides upstream and downstream sealing can best be explained by assuming a number of different operating conditions. Assuming first that there is no pressure applied to either flow passages 16 and 17 and that no pressure exists in body space 22, mounting means 52 is pressed against valve surface 78 solely by springs 85. Also O-ring 54 presses against lips 83 and is compressed between surfaces 82 and 78. By virtue of such compression sealing contact is established between each O-ring and the adjacent valve surface 78.

Assuming now that fluid pressure is applied to flow passage 17 (upstream side) and that valve element 23 is in its closed position as shown in FIG. 4a. Under such operating conditions the pressure in body space 22 is either equal to or less than the pressure in passage 17. Upon advancing valve element 23 closer to its open position as shown in FIG. 4b, trapped upstream pressure in corner 91 urges O-ring 54 upward and outward, a force which has the tendency of dislodging O-ring 54.

Corner 90 on the other hand is vented to body space 22 through the adjacent surfaces between inner and outer mounting rings 60 and 61 so that corner 90 is maintained at the lower body space pressure. During further opening, the bottom surface of O-ring 54 may be forced upward temporarily by the trapped upstream pressure thereby relieving the trapped pressure to corner 90 which is vented into the body space. Ordinarily, since corner 91 is not in communication with the upstream pressure, there will be no further build up of pressure in corner 91. Of course, if a soft O-ring is utilized, the upstream pressure may force its way into corner 91 past lip 83. Under such operating conditions, deformation of the O-ring will continuously vent corner 91 to corner 90 and thereby to body space 22. It may therefore be found desirable to utilize an O-ring having sufficient hardness to withstand deformation except when pressures are very high. When the valve is fully open, as shown in FIG. 4c, the pressure about O-ring 54 is substantially the same and consequently no net forces are encountered tending to dislodge it from the recess.

The operation of closing of valve 10 is as follows: Initially both corners 90 and 91 are at the same pressure. As soon as valve surface 78 engages O-ring 54 as shown in FIG. 4b, corner 91 may be exposed to upstream pressure by fluid entering past lip 83. Corner 90, due to venting to body space 22, will remain at the lower body space pressure. Retaining lips 83 and the working surface 78 of the valve element will engage the O-ring and thereby prevent dislodgement so that valve 10 may assume its fully closed position without fear of seal dislodgement.

Assume now that fluid pressure is applied to passage 16 so that passage 17 becomes the downstream side and body space 22 is upstream with respect to O-ring 54 as shown in FIG. 4. If there is no downstream sealing, then the pressures about seal ring 54 are equal and there is little tendency to dislodge the same. However, in case of downstream sealing and with valve element 33 in the closed position shown in FIG. 4a, corner 90 is exposed to the higher body space pressure and corner 91 is at an unknown pressure which is usually downstream pressure with respect thereto.

As valve element 23 turns to its open position, the projecting face of O-ring 54 is exposed to upstream pressure which urges the seal ring into the recess. Corner 90 is exposed likewise to the relatively high body space pressure thereby urging O-ring 54 downwards and outwards. The pressure in corner 91, as long as sealed from space 90 is less than the body space pressure which, therefore, tends to urge the O-ring 54 into the corner of space 91. Consequently there is only a very small or no tendency for dislodging O-ring 54. In closing the valve if the pressure in corner 91 is not relieved, the upstream pressure upon the exposed face of O-ring 54 is sufficient together with retaining lips 83 to keep the seal ring firmly in place. The trapped upstream pressure will not dislodge the O-ring providing the O-ring is made of sufficiently hard material to prevent undue distortion.

Referring now to FIG. 5, there is shown a valve of the gate type incorporating the mounting means of this invention. A valve 100 includes a pair of valve passage housings 106 and 107 and a fabricated valve body 103. Valve body 103 includes a pair of side plates 104 and 105 forming side walls of valve 100 which are connected to one another by a body band (not shown). Valve passage housings 106 and 107 having the form of cylindrical sleeves are welded into openings cut into side plates 104 and 105 and define a pair of flow passages 101 and 102. Ribs 108 are welded laterally across side plates 104 and 105 to provide stiffening members to add greater rigidity to the plates and to prevent the side plates from bulging under pressure. The space between side plates 104 and 105 defines a valve body space 110.

A valve element such as gate 111 which is movable upwards and downwards between open and closed position is housed in body space 110. Suitable mechanism for raising and lowering gate 111 is conventionally provided (not shown). Gate 111 includes an opening 112 through which fluid passes when gate 111 is in its raised or open position and opening 112 is aligned with flow passages 101 and 102.

A pair of floating mounting means 113 and 114 are provided on either side of gate 111 mounting O-rings 115 for seating against complementary surfaces provided in valve passage housing 106 and 107 and O-rings 116 for sealing with valve surfaces disposed on opposite sides of gate 111. The diameter of the outer line of contact of O-rings 116 is selected to be smaller than the outside diameter of O-ring 115 so that the fluid pressure differential on the upstream side urges floating mounting means on the upstream side into sealing contact with upstream surface of gate 111. Downstream sealing is provided by movement of the gate against the downstream seal ring.

Floating mounting means 113 and 114 are alike and each comprises a larger inner mounting ring 120 and a smaller outer mounting ring 121, both being made of metal and being annular in shape. Inner mounting ring 120 is cylindrical and includes a main portion 122 and a tail portion 123 of reduced outside diameter. The adjacent interior portion of flow passage 102 is provided with a cylindrical bore 124 to slidingly receive tail portion 123. A groove or recess 125 is provided in the outside surface of tail portion 123 for accommodating O-ring 115. Of course, instead of groove 125, a further reduced section (such as tail section 65, FIG. 3) may be provided so that O-ring 115 is retained as seat ring means 114 slides forward and backwards.

Inner mounting ring 120 is also provided with a cylindrical outwardly depending shoulder 126 (best seen in FIG. 6) which receives a corresponding recess in outer seat ring 121 as illustrated. Outer mounting ring 121 is provided with a plurality of countersunk openings 127 for receiving screws 128 which are held in place by tapped holes 129 in inner mounting ring 120. Outer surfaces 130 and 131 of inner mounting ring 120 and outer mounting ring 121 respectively form a planar valve surface opposite to a valve surface 132 of gate 111. A groove or recess 133 is provided by surfaces 134, 135 and 136, surface 135 forming the bottom and surfaces 134 and 136 the sides thereof. Surfaces 134 and 136 are curved at their ends as illustrated to form lips 137 for retaining O-ring 116.

In operation, shown best in FIGS. 6a, 6b and 6c, recess 133 is vented to body space 110 just as the grooves described in connection with the mounting means for ball valve 10. If passage 102 forms the upstream passage, then upon opening valve 100, body space 110 is at lower pressure with respect thereto and recess corner 140, being vented to body space 110 is at a lower pressure than corner 141 thereby aiding retention and preventing dislodgement of O-ring 116 during opening.

If recess 141 were vented to the upstream side the upstream pressure behind O-ring 116 would tend to dislodge it, a condition not encountered in the construction of this invention.

If flow passage 102 is at downstream pressure, then recess corner 140, in communication with body space 110, is at a higher pressure. However, since the exposed face of O-ring 116 is also subjected to the higher pressure, venting of recess corner 140 is of little consequence and the O-ring is easily retained by lips 137.

The gate valve illustrated in FIG. 5 has, as has already been explained, a fabricated body. The present invention is just as readily incorporated in gate valves having conventional cast bodies as will be immediately apparent to those skilled in the art.

There has been described a new and novel floating mounting means comprising an inner and an outer mounting ring in which the inner mounting ring forms the main portion of the floating mounting means and the outer mounting ring forms the outer recess wall of the O-ring accommodating recess. The recess is vented to the body space which aids the upstream side of the valve by preventing dislodgement of the upstream seal ring without being detrimental to the downstream located seal ring in the case of a valve in which not only the upstream but also the downstream side is sealed. The construction has the further advantages of permitting the sealing accommodating recess to be spaced closer to the inner cylindrical bore of the mounting means so that for a given size of flow passage, a smaller diameter seal ring may be utilized for sealing against the movable valve element. As a result of having a smaller diameter seal ring, a smaller valve element may be employed resulting in a saving in manufacturing cost, a decrease in weight and an overall economy in operation and maintenance requirement.

What is claimed is:

1. A valve construction comprising:
   a valve body including a pair of flow passages and a body space therebetween,
   a valve element disposed in said body space and moveable between an open and a closed position,
   a resilient seal ring generally embracing each of said flow passages for normal sealing contact with said valve element,
   a mounting means for each said seal ring embracing each of said flow passages and being formed to include a recess of relatively fixed dimension for accommodating said seal ring,
   said recess being defined by inner and outer side walls and a bottom wall opposite said valve element,
   said seal ring being compressed between said bottom wall and said valve element when opposed thereby but when undeformed being loosely accommodated between said side walls,
   inwardly extending lips on the outer ends of said inner and outer side walls spaced closer than the cross sectional dimension of said seal ring whereby said seal ring may move outward under pressure of fluid behind it into sealing engagement with said lips and to be retained thereby, and
   a pressure-equalizing passageway connecting the outer bottom corner of said recess with said body space,
   the inner bottom corner being in sealed isolation from said flow passages,
   said seal ring being deformable by fluid pressure in said inner bottom corner in excess of pressure in said body space to permit relief of pressure from said inner bottom corner.

2. A valve construction comprising:
   a valve body including a pair of flow passages and a body space therebetween,
   a valve element disposed in said body space and moveable between an open and a closed position,
   a resilient seal ring generally embracing each of said flow passages for normal sealing contact with said valve element,
   a mounting means for each said seal ring embracing each of the said flow passages and being formed to include a recess of relatively fixed dimensions for accommodating said seal ring,
   said recess being defined by inner and outer side walls and a bottom wall opposite said valve element,
   said seal ring when in sealing engagement with said valve element being compressed between said valve element and said bottom wall but when undeformed being loosely accommodated between said side walls, and
   a pressure-equalizing passageway connecting the outer bottom corner of said recess with said body space, the inner bottom corner being in sealed isolation from said flow passages.

3. A valve construction adapted for sealing the upstream side and comprising:
   a valve body including upstream and downstream flow passages and a body space therebetween;

a valve element disposed in said body space and movable between open and closed positions;
at least one resilient seal ring of the O-ring type for establishing a seal between said upstream flow passage and said valve element when said valve element is in its closed position;
and mounting means formed with a recess of substantially fixed width loosely accommodating said seal ring for limited radial movement,
said mounting means being slidably received in one of said valve element and upstream flow passage for limited motion substantially parallel to the axis of said upstream flow passage,
the other one of said valve element and upstream flow passage being provided with a valve working surface for sealing contact with said seal ring,
said mounting means including an inner mounting ring sealed with respect to said one of said valve element and upstream flow passage and having an imperforate face opposite said valve working surface and an imperforate boss extending outwardly from said face,
the peripheral surface of said boss and said face forming, respectively, the inner side wall and bottom wall of said recess joined by an imperforate recess corner,
said mounting means further including an outer mounting ring mounted upon said face and having an inner bore embracing said boss in substantially fixed radial relationship thereto,
the peripheral surface of said inner bore forming the outer side wall of said recess,
there being a space between said inner and outer mounting ring forming a pressure communication vent between the outer corner of said recess and said body space,
said seal ring being deformable by fluid pressure so that pressure vented to said recess from said body space in excess of pressure of fluid in the inner corner of said recess will urge said seal ring toward said inner corner, and so that pressure of fluid in said inner corner in excess of pressure in said body space will urge said seal ring outwardly to permit escape of said fluid past said seal ring through said vent.

4. A valve construction adapted for sealing the upstream side and comprising:
a valve body including upstream and downstream flow passages and a body space therebetween;
a valve element disposed in said body space and movable between open and closed position;
at least one resilient seal ring of the O-ring type for establishing a seal between said upstream flow passage and said valve element when said valve element is in its closed position;
and mounting means formed with a recess of substantially fixed width loosely accommodating said seal ring for limited radial movement and mounted for limited motion substantially parallel to the axis of said upstream flow passage,
said mounting means being slidably received in said upstream flow passage,
said valve element being provided with a valve working surface for sealing contact with said seal ring,
said mounting means including an inner mounting ring slidably received in and sealed with respect to said upstream flow passage having an imperforate face opposite said valve working surface and an imperforate boss extending outwardly from said face,
the peripheral surface of said boss and said face forming, respectively, the inner side wall and the bottom wall of said recess joined by an imperforate inner recess corner,
said mounting means further including an outer mounting ring mounted upon said face and having an inner bore embracing said boss in substantially fixed radial relationship thereto,
the peripheral surface of said inner bore forming the outer side wall of said recess,
there being a space between said inner and outer mounting ring forming a pressure communication vent between the outer corner of said recess and said body space,
said seal ring being deformable by fluid pressure so that pressure vented to said recess from said body space in excess of pressure of fluid in the inner corner of said recess will urge said seal ring toward said inner corner and so that pressure of fluid in said inner corner in excess of pressure in said body space will urge said seal ring outwardly to permit escape of said fluid past said seal ring through said vent.

5. A valve construction comprising:
a valve body including a pair of flow passages and a body space therebetween;
a valve element disposed in said body space and movable between open and closed positions;
a resilient seal ring of the O-ring type associated with each flow passage for establishing seals between the associated flow passages and said valve element when said valve element is in its closed position;
and an annular mounting means associated with each of said seal rings and formed with a recess of substantially fixed width loosely accommodating said seal ring for limited radial movement,
said mounting means being mounted for limited motion substantially parallel to its annular axis,
each of said mounting means being slidably received in its associated flow passage,
said valve element being provided with a valve working surface for sealing contact with the associated seal ring,
said mounting means including an inner mounting ring slidably received in and sealed with respect to said associated flow passage and having an imperforate face opposite said associated valve working surface and an imperforate boss extending outward from said face,
the peripheral surface of said boss and said face forming, respectively, the inner side wall and the bottom wall of said recess joined by an imperforate inner recess corner,
said mounting means further including an outer mounting ring mounted upon said face and having an inner bore embracing said boss in substantially fixed radial relationship thereto,
the peripheral surface of said inner bore forming the outer side wall of said recess, there being a space between said inner and outer mounting rings forming a pressure communication vent between the outer corner of said recess and said body space,
and said seal ring being deformable by fluid pressure so that pressure vented to said recess from said body space in excess of pressure of fluid in the inner corner of said recess will urge said seal ring toward said inner corner and so that pressure of fluid in said inner corner in excess of pressure in said body space will urge said seal ring outwardly to permit escape of said fluid past said seal ring through said vent.

6. A valve construction comprising:
a valve body including a pair of flow passages and a body space therebetween;
a valve element disposed within said body space and movable between an open and closed position,
said valve element including valve working surfaces on opposite sides of said valve element in registry with said pair of flow passages when said valve element is in its closed position;
a resilient seal ring of the O-ring type embracing each of said pair of flow passages for normal sealing contact with the associated valve working surface;
and a mounting means for each resilient seal ring formed with an annular recess of substantially fixed width loosely accommodating said seal ring for limited radial movement;

said mounting means including an inner mounting ring and an outer mounting ring, said inner mounting ring being slidingly received by and sealed with respect to its associated flow passage and having an imperforate face opposite the associated valve working surface, an imperforate boss in said inner ring extending outwardly from said face so that its exterior surface defines the inner peripheral side wall of said recess with said face forming the bottom wall of said recess, said bottom wall and said side wall merging to form an imperforate inner bottom recess corner, said outer mounting ring having an inner bore whose interior surface defines the outer peripheral side wall of said recess, said outer mounting ring being secured to said inner mounting ring in fixed radial relationship thereto and against said face with a space therebetween so that the corner defined by said outer side wall and said bottom wall is in fluid communication with said body space forming a vent, said seal ring being deformable by fluid pressure so that pressure vented to said recess from said body space in excess of pressure of fluid in the inner corner of said recess will urge said seal ring toward said inner corner and so that pressure of fluid in said inner corner in excess of pressure in said body space will urge said seal ring outwardly to permit escape of said fluid past said seal ring through said vent.

7. A ball valve construction comprising:

a valve body including a pair of axially aligned flow passages and a body space therebetween;

a ball shaped valve element disposed within said body space and rotatable between open and closed positions, said valve element including an inner bore and a pair of valve working surfaces embracing the openings of said inner bore;

resilient seal rings of the O-ring type generally embracing said flow passages for normal sealing contact with said valve working surfaces;

and mounting means for each resilient seal ring formed with an annular recess of substantially fixed width loosely accommodating said seal ring for limited radial movement, each of said mounting means including an inner mounting ring and an outer mounting ring, said inner mounting rings being slidably received by and sealed with respect to said flow passages and having imperforate faces opposite said valve working surfaces, each of said faces being provided with an outwardly extending imperforate integral boss whose exterior surface defines the inner peripheral side wall of said recesses with the face integral therewith forming the bottom wall of said recesses, said side and bottom walls forming between them an imperforate inner bottom corner, said outer mounting rings having inner bores whose interior surfaces define the outer peripheral side walls of said recesses, each of said outer mounting rings being secured to one of said inner mounting rings in fixed radial relationship and against the face on said inner mounting ring, so that the corner defined by said outer side wall and said bottom wall is in fluid communication with said body space forming a vent, said seal ring being deformable by fluid pressure so that pressure vented to said recess from said body space in excess of pressure of fluid in the inner corner of said recess will urge said seal ring toward said inner corner, and so that pressure of fluid in said inner corner in excess of pressure in said body space will urge said seal ring outwardly to permit escape of said fluid past said seal ring through said vent.

8. A valve construction comprising:

a valve body including a pair of flow passages and a body space therebetween;

a valve element disposed in said body space and movable between open and closed positions;

resilient seals of the O-ring type generally embracing said flow passages for normal sealing contact with opposite sides of said valve element;

and mounting means for said seat rings slidably received in each of said flow passages for limited movement towards and away from said valve element, said mounting means being sealed with respect to said flow passages and being formed to include a recess of substantially fixed width loosely accommodating said seal ring for limited radial movement, said mounting means including an inner mounting ring formed to define in imperforate continuity the inner peripheral side wall and the bottom wall of said recess and an outer mounting ring formed to define the outer peripheral side wall of said recess, said outer mounting ring being mounted to said inner mounting ring with a space therebetween forming a vent providing pressure communication between the corner defined by the bottom and outer side wall of said recess and said body space, said recess being sealed with respect to its associated flow passage and isolated therefrom, said seal ring being deformable by fluid pressure so that pressure vented to said recess from said body space in excess of pressure of fluid in the inner corner of said recess will urge said seal ring toward said inner corner, and so that pressure of fluid in said inner corner in excess of pressure in said body space will urge said seal ring outwardly to permit escape of said fluid past said seal ring through said vent.

9. A valve construction comprising:

a valve body including a pair of flow passages and a body space therebetween;

a valve element disposed in said body space and movable between open and closed positions;

resilient seals of the O-ring type generally embracing said flow passages for normal sealing contact with said valve element;

and mounting means for said seal rings slidably received in each of said flow passages and capable of limited movement towards and away from said valve element, said mounting means being sealed with respect to said flow passages and being formed to include a recess of substantially fixed width loosely accommodating said seal ring for limited radial movement, said mounting means including an inner mounting ring and an outer mounting ring mounted to said inner mounting ring with a space therebetween forming a vent providing pressure communication between the bottom of said recess and said body space, the bottom of said recess being in pressure isolation from said flow passages, said seal ring being deformable by fluid pressure so that pressure vented to said recess from said body space in excess of pressure of fluid in the inner corner of said recess will urge said seal ring toward said inner corner, and so that pressure of fluid in said inner corner in excess of pressure in said body space will urge said seal ring outwardly to permit escape of said fluid past said seal ring through said vent.

10. A valve construction adapted for sealing the upstream side and comprising:

a valve body including upstream and downstream flow passages and a body space therebetween;

a valve element disposed in said body space and movable between open and closed position;

at least one resilient seal ring of the O-ring type for establishing a seal between said upstream flow passage and said valve element when said valve element is in its closed position;

and mounting means formed with a recess of substantially fixed width loosely accommodating said seal ring for limited radial movement and mounted for limited motion substantially parallel to the axis of said upstream flow passage, said mounting means being slidably received in said upstream flow passage, said valve element being provided with a valve working surface for sealing contact with said seal ring, said mounting means including an inner mounting ring slidably received in and sealed with respect to said upstream flow passage and having an imperforate face opposite said valve working surface and an imperforate boss extending outwardly from said face, a radial lip around the outer end of said boss remote from said face, the peripheral surface of said boss and said face forming, respectively, the inner side wall and the bottom wall of said recess joined by an imperforate inner recess corner, said mounting means further including an outer mounting ring mounted upon said inner mounting ring and having an inner bore embracing said boss and extending outwardly from said face, a radial lip around said bore at the outer end thereof, the peripheral surface of said inner bore forming the outer side wall of said recess, there being a space between said inner and outer mounting ring forming a pressure communication vent between the outer corner of said recess and said body space, said seal ring being deformable by fluid pressure so that pressure vented to said recess from said body space in excess of pressure of fluid in the inner corner of said recess will urge said seal ring toward said inner corner and so that pressure of fluid in said inner corner in excess of pressure in said body space will urge said seal ring outwardly to permit escape of said fluid past said seal ring through said vent and to seal against and be retained by said radial lips.

References Cited in the file of this patent

UNITED STATES PATENTS

| | | |
|---|---|---|
| 2,796,230 | Grove | June 18, 1957 |
| 2,810,542 | Bryant | Oct. 22, 1957 |
| 2,889,134 | Bryant | June 2, 1959 |
| 2,950,897 | Bryant | Aug. 30, 1960 |
| 2,963,262 | Shafer | Dec. 6, 1960 |
| 3,083,945 | Shafer | Apr. 2, 1963 |